(12) United States Patent
Kawaura

(10) Patent No.: US 10,761,797 B2
(45) Date of Patent: Sep. 1, 2020

(54) PRINT CONTROL APPARATUS, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Toshinori Kawaura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/267,876

(22) Filed: Feb. 5, 2019

(65) Prior Publication Data

US 2019/0258440 A1 Aug. 22, 2019

(30) Foreign Application Priority Data

Feb. 19, 2018 (JP) .................................. 2018-027250

(51) Int. Cl.
*G06F 3/12* (2006.01)
*G06F 9/4401* (2018.01)

(52) U.S. Cl.
CPC .......... *G06F 3/1275* (2013.01); *G06F 3/1204* (2013.01); *G06F 3/1224* (2013.01); *G06F 3/1285* (2013.01); *G06F 3/1286* (2013.01); *G06F 9/4411* (2013.01)

(58) Field of Classification Search
CPC ..... G06F 3/1275; G06F 3/1204; G06F 3/1286
See application file for complete search history.

(56) References Cited

U.S. PATENT DOCUMENTS 8,699,056 B2 4/2014 Shudo
2008/0192290 A1* 8/2008 Yamada .............. H04L 41/0806
358/1.15
2018/0198948 A1* 7/2018 Hiramoto ........... H04N 1/33384

FOREIGN PATENT DOCUMENTS

EP 1 956 751 A2 8/2008
JP 4311440 B2 8/2009

OTHER PUBLICATIONS

Extended European Search Report, dated Jul. 9, 2019, issued in European Patent Application No. 19152552.6.

* cited by examiner

*Primary Examiner* — Moustapha Diaby
(74) *Attorney, Agent, or Firm* — Venable LLP

(57) ABSTRACT

A print control apparatus for controlling a printing apparatus includes a display control unit displays, on a display unit, a setting content associated with setting processing of a default printing apparatus that can be used without accepting a selection operation by a user, and an acquisition unit acquires information about a function of setting the default printing apparatus, wherein the function is a function of automatically setting, as the default printing apparatus, a printing apparatus which has been instructed to execute printing. In addition, a restriction unit restricts, if the acquired information indicates enabling of the function, display processing of the setting content so the setting content is not operated, wherein the display control unit, the acquisition unit and the restriction unit are implemented by at least one processor.

15 Claims, 11 Drawing Sheets

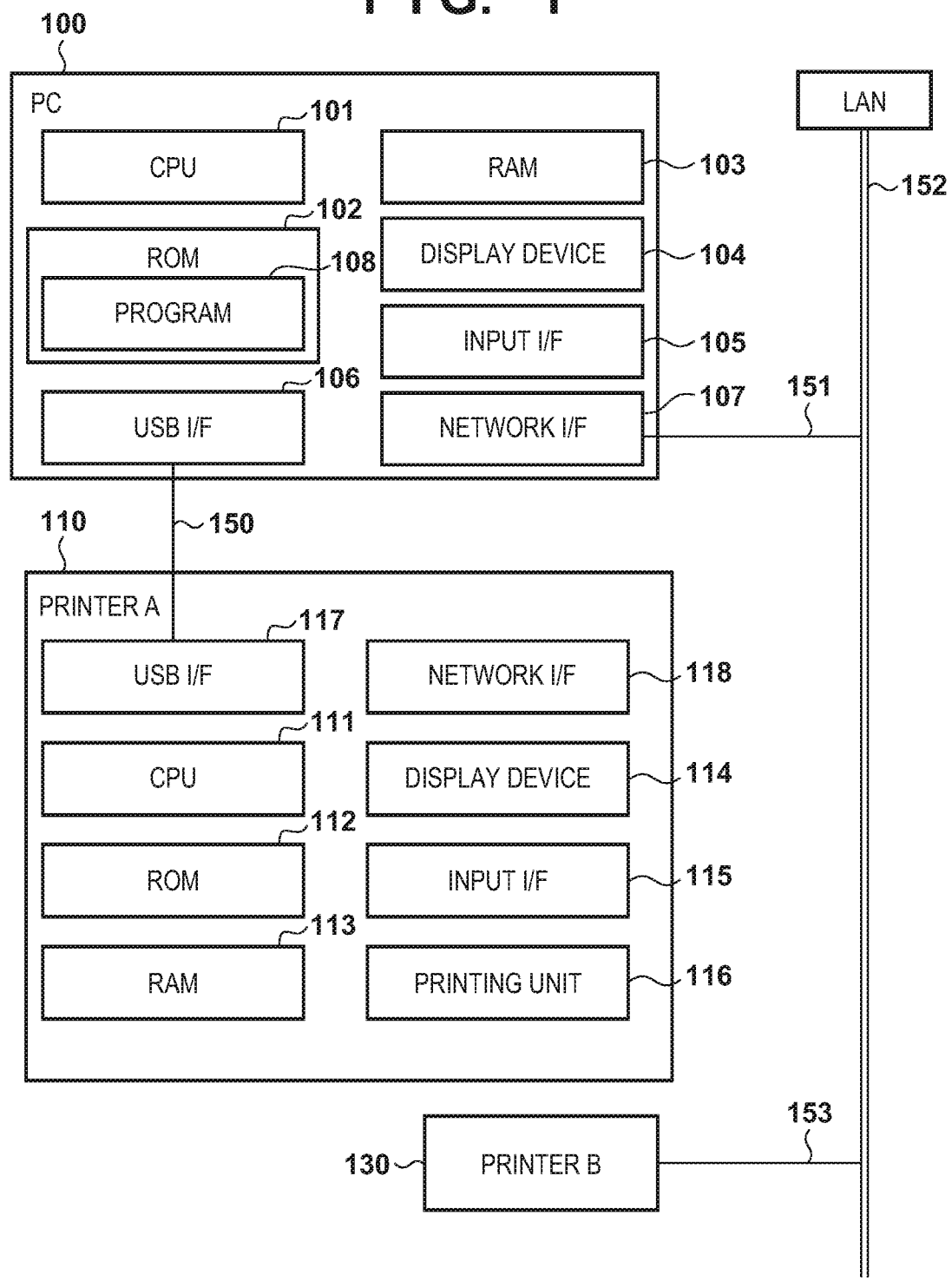

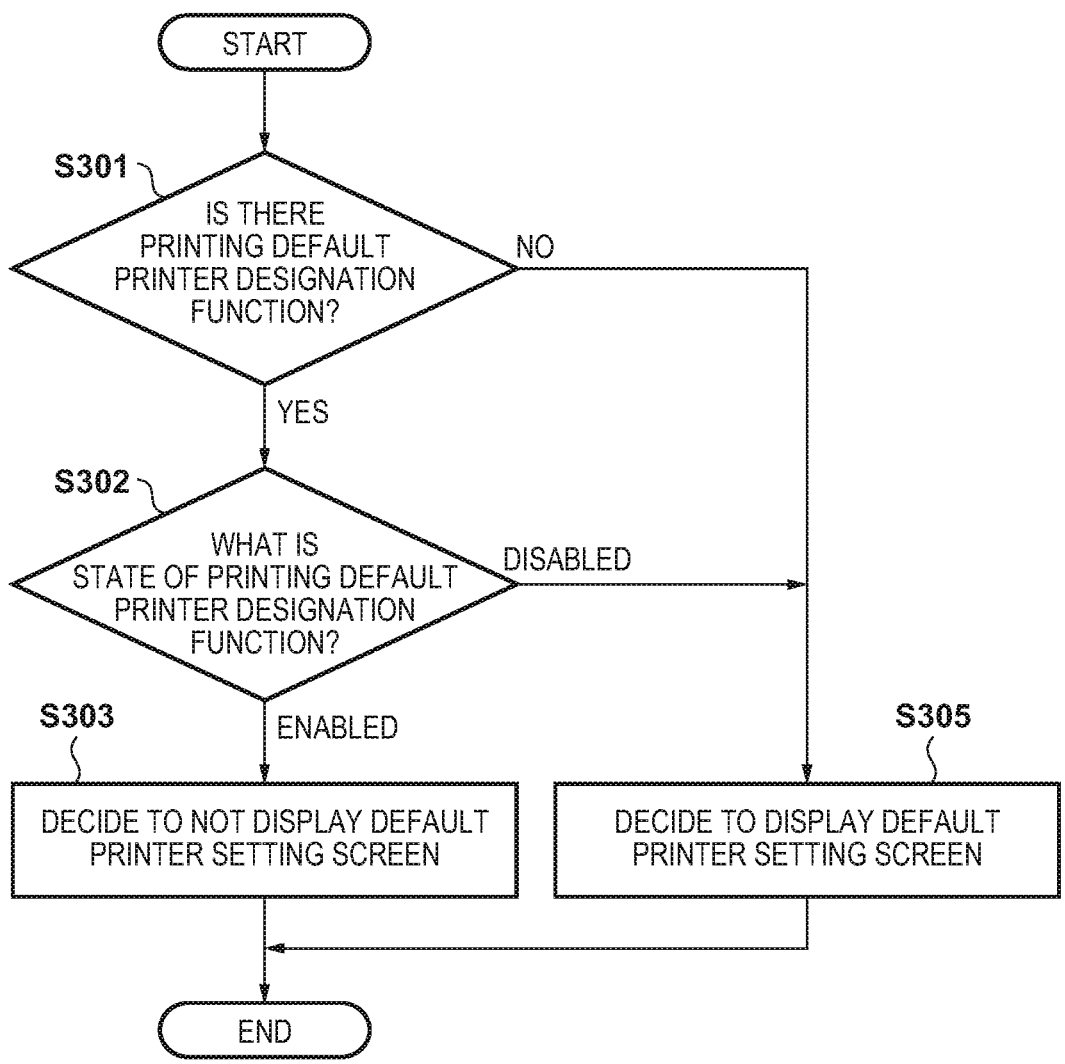

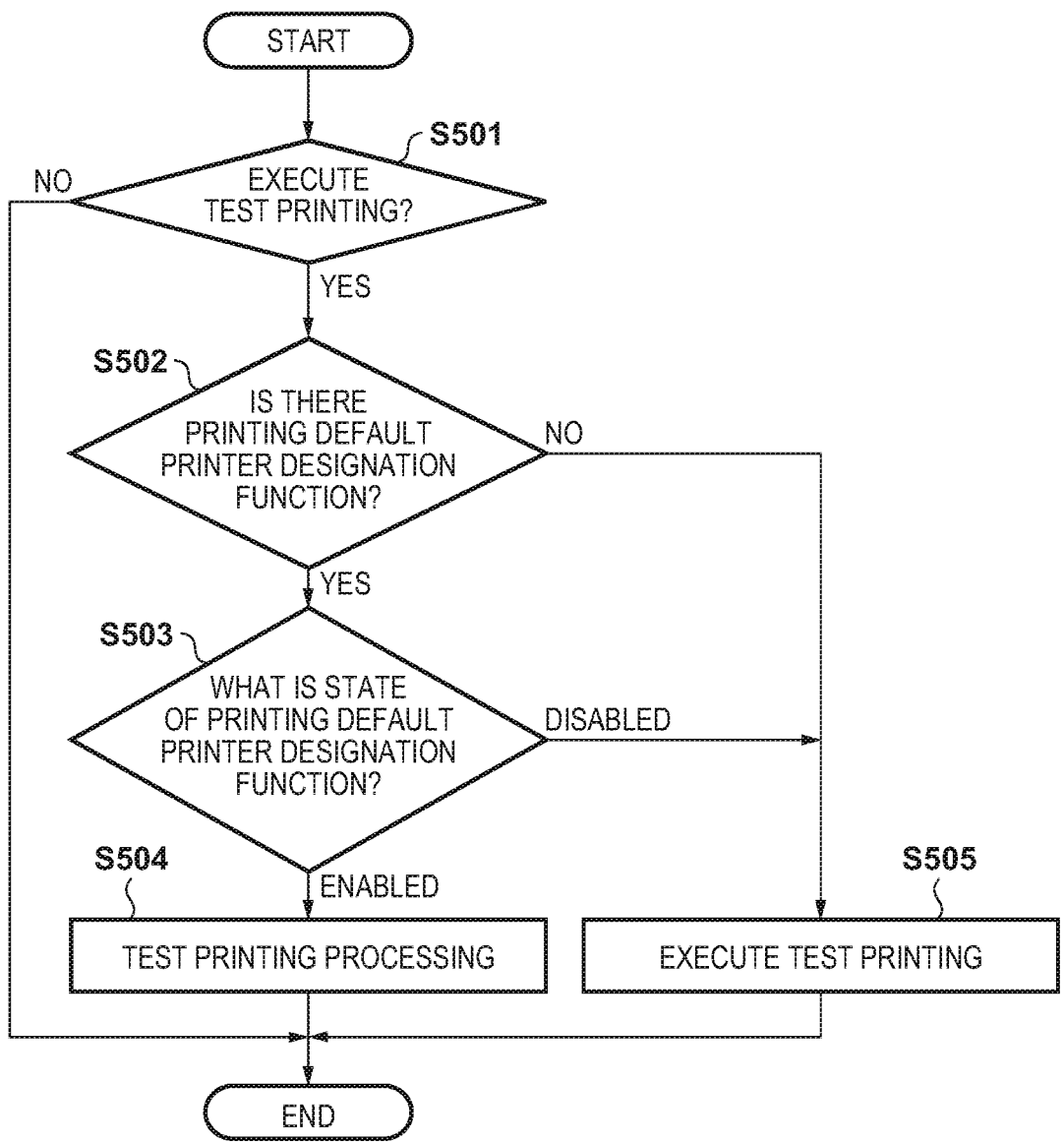

TEST PRINTING

PERFORM TEST PRINTING FOR CONFIRMATION OF THE OPERATION OF THE PRINTER. SET PLAIN PAPER ON THE PRINTER AND CLICK [EXECUTE].
ONCE TEST PRINTING HAS ENDED, CLICK [NEXT].

IF A PRINT ERROR HAS OCCURRED, REDO A SETTING IN ACCORDANCE WITH A SCREEN INSTRUCTION.

[EXECUTE]

[NEXT]

COMPLETE SETUP

SETUP FOR PRINTING FROM PERSONAL COMPUTER IS COMPLETE. SOFTWARE INSTALLATION WILL CONTINUE.

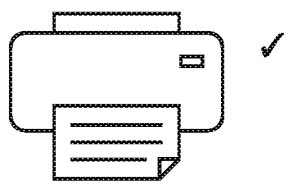

☑ SET PRINTER NORMALLY USED

[STOP]  [NEXT]

PRINT CONTROL APPARATUS, CONTROL METHOD, AND NON-TRANSITORY COMPUTER-READABLE STORAGE MEDIUM STORING PROGRAM

BACKGROUND OF THE INVENTION

Field of the Invention

The present invention relates to a print control apparatus for controlling a printing apparatus, a control method, and a non-transitory computer-readable storage medium storing a program.

Description of the Related Art

When executing printing from software having a printing function, to determine a printing apparatus (to be referred to as a "printer" hereinafter) from which printing is to be executed, a printer (or a printer icon associated with a printer) is selected. There is conventionally provided a function of presetting, as a defined printing apparatus (to be referred to as a "default printer" hereinafter), a printer which is frequently used. This allows printing without the selection of a printer icon (Japanese Patent No. 4311440).

In Windows 10®, a function of "managing a printer normally used in Windows" is added. This function is a function (to be referred to as a "printing default printer designation function" hereinafter) in which an operating system (to be referred to as an "OS" hereinafter) automatically sets, as a default printer, a printer used last for printing.

However, even if a user wants to execute only test printing without registering a printer as a default printer, if this function is in an enabled state, the printer is unwantedly registered as a default printer.

SUMMARY OF THE INVENTION

An aspect of the present invention is to eliminate the above-mentioned problems with the conventional technology. The present invention provides a print control apparatus for appropriately setting a printing apparatus used by default, a control method, and a non-transitory computer-readable storage medium storing a program.

The present invention in one aspect provides a print control apparatus for controlling a printing apparatus, comprising: a display control unit configured to display, on a display unit, a setting content associated with setting processing of a default printing apparatus that can be used without accepting a selection operation by a user; an acquisition unit configured to acquire information about a function of setting, as the default printing apparatus, a printing apparatus instructed to execute printing; and a restriction unit configured to restrict, if the acquired information indicates enabling of the function, display processing of the setting content so the setting content is not operated.

According to the present invention, it is possible to appropriately set a printing apparatus used by default.

Further features of the present invention will become apparent from the following description of exemplary embodiments with reference to the attached drawings.

BRIEF DESCRIPTION OF THE DRAWINGS

FIG. 1 is a block diagram showing a system configuration;

FIG. 3 is a flowchart illustrating display control processing of a default printer setting screen;

FIG. 5 is a flowchart illustrating processing of disabling a default printer designation function;

FIGS. 8A and 8B are views each showing a screen of the installer;

DESCRIPTION OF THE EMBODIMENTS

Figure 2A:
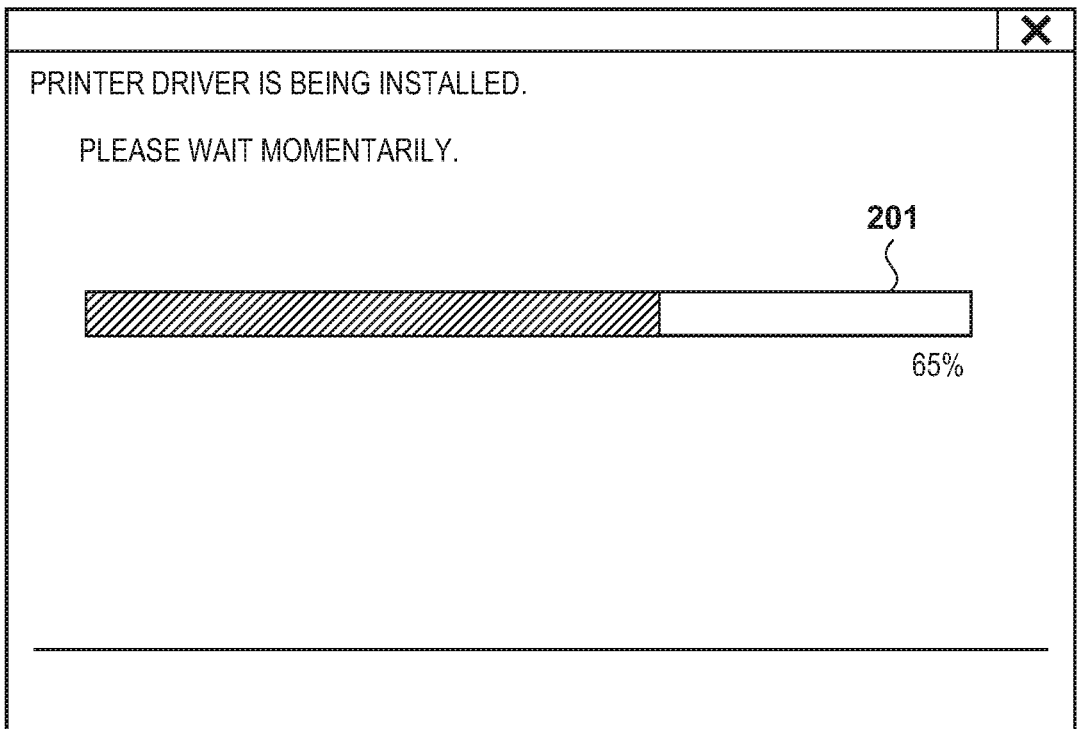
FIGS. 2A to 2D are views each showing a screen of an installer.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

First Embodiment

FIG. 1 is a block diagram showing the configuration of a print system including a PC 100, a printer A 110, and a printer B 130. The PC 100 operates as a print control apparatus for controlling a printer (printing apparatus). The PC 100 includes a CPU 101, a ROM 102, a RAM 103, a display device 104, and an input interface (I/F) 105. The PC 100 also includes a USB I/F 106 and a network I/F 107. However, the PC 100 may be configured to include one of the USB I/F 106 and the network I/F 107. The ROM 102 stores a program 108 such as a printer driver and an installer (both of which will be described later). The PC 100 can communicate with the printer A 110 via a USB cable 150. The PC 100 can also be connected to a LAN 152 via a network connection 151 implemented by an Ethernet cable or Wi-Fi.

If the printer B 130 can be connected to the LAN 152 via a network connection 153, the PC 100 and the printer B 130 can communicate with each other in the environment of the same LAN 152. If a plurality of USB I/Fs 106 are mounted on the PC 100 or a USB hub (not shown) is used, the PC 100 can be connected to a plurality of printers simultaneously. The PC 100 can be connected to a plurality of printers simultaneously via the LAN 152. In this way, a plurality of printers can be connected to the PC 100 to perform communication. Therefore, printers connected to the PC 100 in FIG. 1 are not limited to the printer A 110 and the printer B 130, and three or more printers may be connected.

The printer A 110 includes a CPU 111, a ROM 112, a RAM 113, a display device 114, an input I/F 115, a printing unit 116, a USB I/F 117, and a network I/F 118. The printer A 110 can be connected to the PC 100 via the USB I/F 117 by the USB cable 150, and communicate with the PC 100. The internal arrangement of the printer B 130 is not shown in FIG. 1 but is the same as that of the printer A 110. The printer B 130 is connected to the LAN 152 via the network connection 153 connected to a network I/F (not shown), and can communicate with the PC 100 connected to the same LAN.

In FIG. 1, as an example, each of the PC 100 and the printers (printer A 110 and printer B 130) includes both the USB I/F and the network I/F as connection I/Fs but may include one of the connection I/Fs. Furthermore, the USB I/F and the network I/F are exemplified as connection I/Fs connectable to the printer (printer A 110 or printer B 130) but communication complying with the Centronics, Bluetooth®, or IrDA standard may be used. The printer A 110 will be described as a representative example of the printer A 110 and printer B 130 unless otherwise specified.

Screens of an installer will be described with reference to FIGS. 2A to 2C. The installer is software that is mounted on the PC 100, and installs a printer driver (not shown) to register the printer A 110 in the PC 100. FIG. 2A shows an installation screen 200 of the installer, and shows a state in which the installer installs the printer driver to register the printer A 110 in the PC 100. A progress bar 201 shows the progress status of installation of the printer driver and a registration operation of the printer A 110.

Figure 2B:
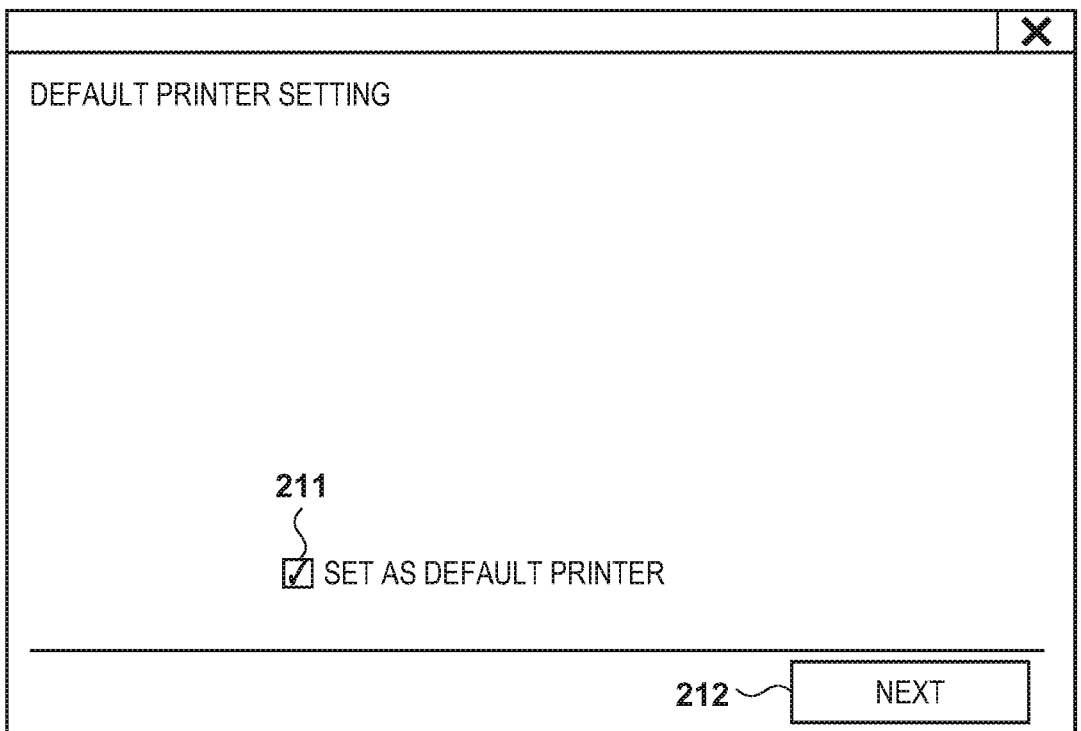

FIG. 2B shows a default printer setting screen 210 of the installer. A checkbox 211 accepts selection of whether to register, as a default printer (default printing apparatus) that is normally used, the printer A 110 registered in FIG. 2A. A state in which the checkbox 211 is checked indicates that the user has set the printer A 110 as a default printer. When a button 212 is pressed, the installer displays a next screen.

Figure 2C:
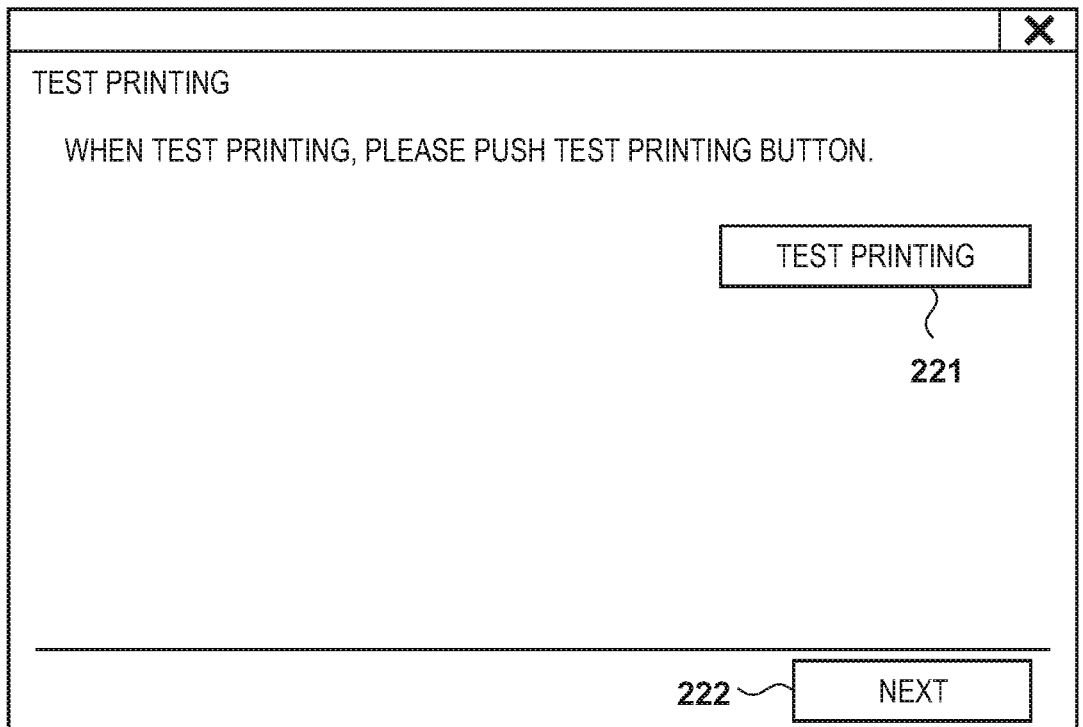

FIG. 2C shows a test printing screen 220 of the installer. When the user presses a button 221, the installer executes test printing in the registered printer A 110. Test printing is executed to confirm that the registered printer A 110 is in a printable state. When a button 222 is pressed, the installer displays a next screen.

Processing of controlling display of the default printer setting screen 210 of the installer will be described with reference to FIG. 3. The processing shown in FIG. 3 is implemented when, for example, the CPU 101 reads out the program stored in the ROM 102 into the RAM and executes it. When the processing shown in FIG. 3 starts, the installer determines whether the printing default printer designation function exists in the OS (step S301). The printing default printer designation function is a function in which the OS automatically sets, as a default printer, a printer used last for printing.

The presence/absence of the printing default printer designation function is determined in step S301 based on, for example, an API, registry information, or whether the printing default printer designation function is supported by the version of the OS. If it is determined in step S301 that the printing default printer designation function exists, the installer determines whether the setting state of the printing default printer designation function is an enabled or disabled state (step S302). The setting state of the printing default printer designation function is determined in step S302 based on, for example, an API or registry information.

If it is determined in step S302 that the printing default printer designation function is in the enabled state, the installer decides not to display the default printer setting screen 210 (step S303). After step S303, the installer ends the processing shown in FIG. 3. On the other hand, if it is determined in step S301 that no printing default printer designation function exists or it is determined in step S302 that the printing default printer designation function is in the disabled state, the installer decides to display the default printer setting screen 210 (step S305). After step S305, the installer ends the processing shown in FIG. 3.

Note that a screen to be displayed is not limited to that shown in FIG. 2B. For example, after completion of installation of the printer driver, a screen for accepting an instruction to execute test printing may be displayed first, as shown in FIG. 8A, and then a screen shown in FIG. 8B or 9 may be displayed. If it is determined in step S302 that the printing default printer designation function is in the disabled state, the screen of FIG. 8B including "set as printer normally used" is displayed. On the other hand, if it is determined in step S302 that the printing default printer designation function is in the enabled state, the screen of FIG. 9 including no "set as printer normally used" is displayed. In this example, "set as printer normally used" has the same meaning as "set as default printer" described above.

As described above, according to this embodiment, only if the printing default printer designation function is in the disabled state, the default printer setting screen 210 is displayed. On the other hand, if the printing default printer designation function is in the enabled state, the setting function of the default printer setting screen 210 is restricted by not displaying the default printer setting screen 210. This can prevent a situation in which although the user designates not to change the default printer by turning off the checkbox 211, the default printer is unwantedly changed by executing test printing. Furthermore, only when the printing default printer designation function does not work (that is, NO in step S301 or disabled state in step S302), the default printer setting screen 210 can be displayed.

Second Embodiment

Figure 2D:
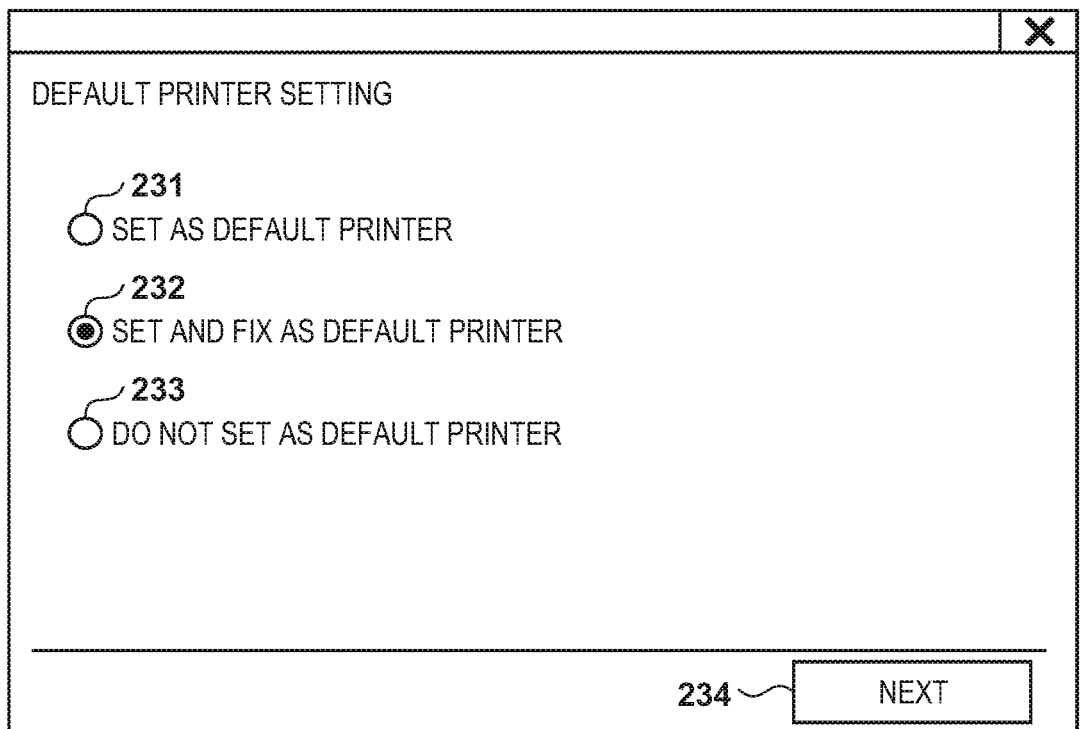

In the second embodiment, the difference from the first embodiment will be described below. In this embodiment, a default printer setting screen 230 shown in FIG. 2D is used instead of the default printer setting screen 210 shown in FIG. 2B.

The default printer setting screen 230 shown in FIG. 2D will be described. Radio buttons 231, 232, and 233 can be selectively accepted from the user. FIG. 2D shows a state in which the radio button 232 is selected. If the radio button 231 is selected, a printer A 110 registered in FIG. 2A is registered as a default printer. If the radio button 232 is selected, the printer A 110 registered in FIG. 2A is registered as a default printer, and the printing default printer designation function is disabled. If the radio button 233 is selected, the printer A 110 registered in FIG. 2A is not registered as a default printer. When a button 234 is pressed, the installer displays a next screen.

Figure 4:
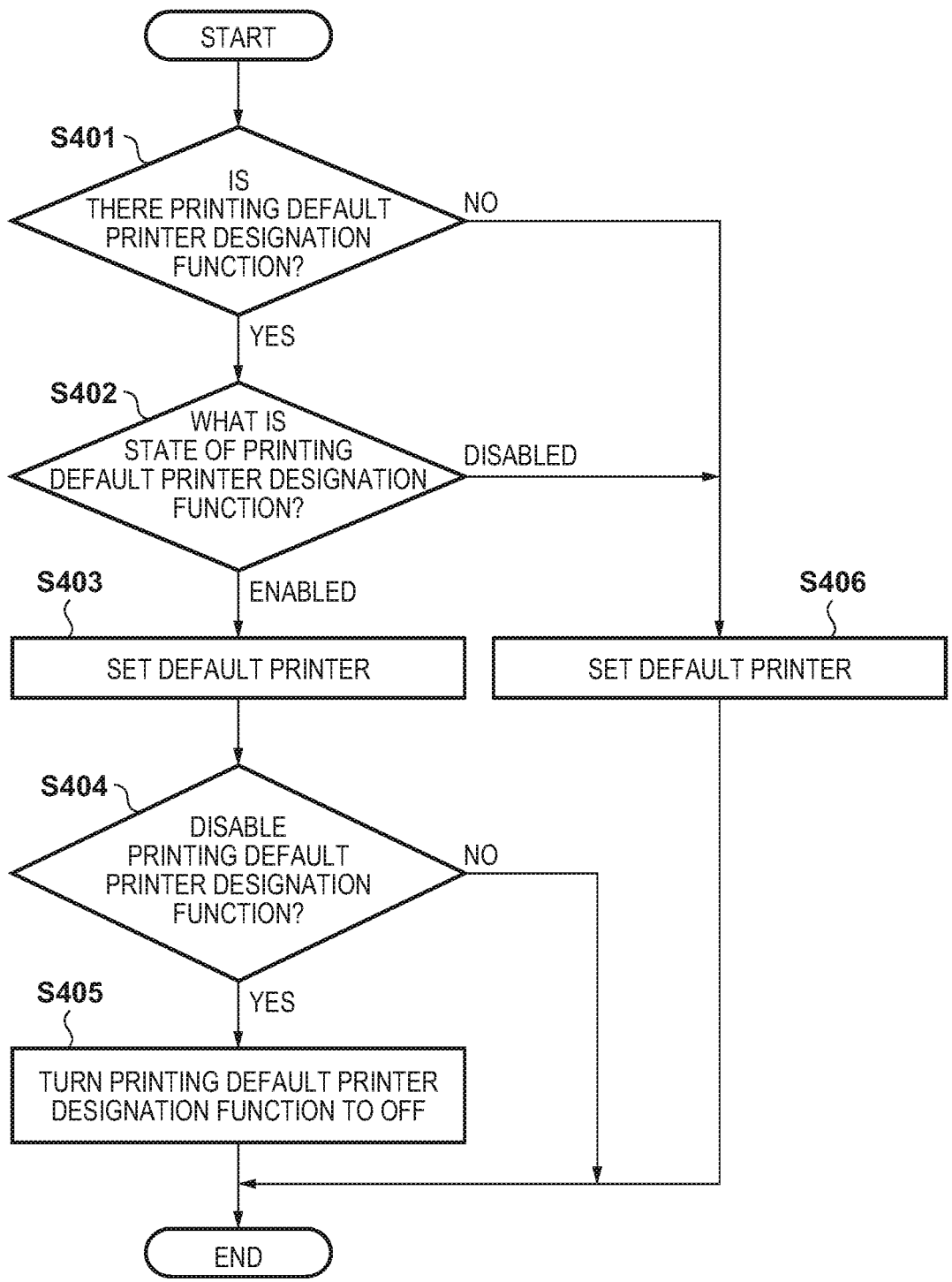
FIG. 4 is a flowchart illustrating processing of disabling the default printer designation function.

The processing of disabling the default printer designation function will be described with reference to FIG. 4. The processing shown in FIG. 4 is implemented when, for example, a CPU 101 reads out a program stored in a ROM 102 into a RAM and executes it. When one of the radio buttons 231 and 232 in FIG. 2D is selected and the button 234 is pressed, the installer starts the processing shown in FIG. 4. When the processing shown in FIG. 4 starts, the installer determines whether the printing default printer designation function exists in an OS (step S401). The presence/absence of the printing default printer designation function is determined in step S401 based on, for example, an API, registry information, or whether the printing default printer designation function is supported by the version of the OS.

If it is determined in step S401 that the printing default printer designation function exists, the installer determines whether the setting state of the printing default printer designation function is an enabled or disabled state (step S402). The setting state of the printing default printer designation function is determined in step S402 based on, for example, an API or registry information. If it is determined in step S402 that the printing default printer designation function is in the enabled state, the installer performs default printer setting processing (step S403). The default printer setting processing in step S403 is implemented when, for example, the installer executes the SetDefaultPrinter API or issues, to the printer A 110, a dummy job that executes no printing.

After step S403, the installer determines whether to disable the printing default printer designation function (step S404). If it is determined in step S404 to disable the printing default printer designation function, that is, if the radio button 232 shown in FIG. 2D has been selected, the printing default printer designation function is turned off (step S405). The processing of turning off the printing default printer designation function in step S405 is implemented by, for example, executing the API or rewriting the registry information. After step S405, the installer ends the processing shown in FIG. 4. If it is determined in step S404 not to disable the printing default printer designation function, that is, if the radio button 231 shown in FIG. 2D has been selected, the installer ends the processing shown in FIG. 4.

Depending on user authority, the processing of turning off the printing default printer designation function in step S405 cannot be executed. In this case, the processing shown in FIG. 4 ends without executing the processes in steps S404 and S405.

If it is determined in step S401 that no printing default printer designation function exists or it is determined in step S402 that the printing default printer designation function is in the disabled state, default printer setting processing is performed (step S406). The default printer setting processing in step S406 is implemented when, for example, the installer executes the SetDefaultPrinter API. After step S407, the installer ends the processing shown in FIG. 4.

As described above, according to this embodiment, the radio button 232 shown in FIG. 2D restricts the printing default printer designation function. This arrangement can prevent the default printer setting from being changed without intention when, for example, the printer A 110 is set as a default printer and then printing is executed in another different printer (for example, the printer B 130).

In the first embodiment, if it is decided not to display the default printer setting screen 210 (step S303) and the button 222 is pressed without executing the test printing button 221 in the test printing screen 220, the default printer setting screen 210 may be displayed. This arrangement can provide a function of setting a default printer to the user who executes no test printing button 221 in the first embodiment. The default printer setting screen 230 has a function of disabling the printing default printer designation function. In the above operation of the first embodiment, the default printer setting screen 230 may be displayed instead of the default printer setting screen 210 to execute the processing shown in FIG. 4. This arrangement can provide a function of setting a default printer to the user who executes no test printing button 221 in the first embodiment, and a function of disabling the printing default printer designation function.

Third Embodiment

In the third embodiment, the difference from the first and second embodiments will be described below. In this embodiment, either a default printer setting screen 210 or 230 can be used.

FIG. 5 is a flowchart illustrating processing of disabling the default printer designation function, which is performed when the user wants to exclude a printer A 110 from a default printer setting. The processing shown in FIG. 5 is implemented when, for example, a CPU 101 reads out a program stored in a ROM 102 into a RAM and executes it. By turning off a checkbox 211 in FIG. 2B or selecting a radio button 233 in FIG. 2D, the installer starts the processing shown in FIG. 5 when displaying a test printing screen 220. When the processing shown in FIG. 5 starts, the installer determines whether the user presses a test printing button 221 (step S501). If it is determined in step S501 that a button 222 is pressed without pressing the button 221, the processing shown in FIG. 5 ends.

If it is determined in step S501 that the button 221 is pressed, the installer determines whether the printing default printer designation function exists in an OS (step S502). The presence/absence of the printing default printer designation function is determined in step S502 based on, for example, an API, registry information, or whether the printing default printer designation function is supported by the version of the OS. If it is determined in step S502 that the printing default printer designation function exists, the installer determines whether the setting state of the printing default printer designation function is an enabled or disabled state (step S503). The setting state of the printing default printer designation function is determined in step S503 based on, for example, an API or registry information. If it is determined in step S503 that the printing default printer designation function is in the enabled state, the installer performs test printing processing (step S504). The test printing processing in step S504 will be described in detail later with reference to FIGS. 6A and 6B. After step S504, the installer ends the processing shown in FIG. 5. On the other hand, if it is determined in the determination processing (step S502) that no printing default printer designation function exists or it is determined in step S503 that the printing default printer designation function is in the disabled state, the installer executes test printing (step S506). After step S506, the installer ends the processing shown in FIG. 5.

The test printing processing in step S504 will be described with reference to FIG. 6A. When the processing shown in FIG. 6A starts, the installer acquires the name of a printer icon currently assigned to the default printer (step S601). Then, the installer executes test printing (step S602). At this time, the printing default printer designation function works, and the OS sets, as a default printer, the printer A 110 used for printing. The installer sets, as a default printer, the printer icon acquired in step S601 (step S603). The default printer setting processing in step S603 is implemented when, for example, the installer executes the SetDefaultPrinter API or issues, to the printer, with the acquired printer icon, a dummy job that executes no printing in the printer. After step S603, the installer ends the processing shown in FIG. 6A.

Note that the timing of acquiring the name of the printer icon assigned to the original default printer in step S601 may be before installation of the printer driver. Since there exists a printer driver of a type of setting, as a default printer, the printer corresponding to the printer icon at a timing when the printer icon is generated, the original default printer may be acquired before installation of the printer driver.

Test printing processing different from that shown in FIG. 6A will be described next with reference to FIG. 6B. When the test printing processing shown in FIG. 6B starts, the installer turns off the printing default printer designation function (step S611). The operation of turning off the printing default printer designation function in step S611 is implemented by, for example, executing the API or rewriting the registry information. Then, the installer executes test printing (step S612). The installer turns on the printing default printer designation function (step S613). The operation of turning on the printing default printer designation function in step S613 is implemented by, for example, executing the API or rewriting the registry information. After step S613, the processing shown in FIG. 6B ends.

Figure 6B:
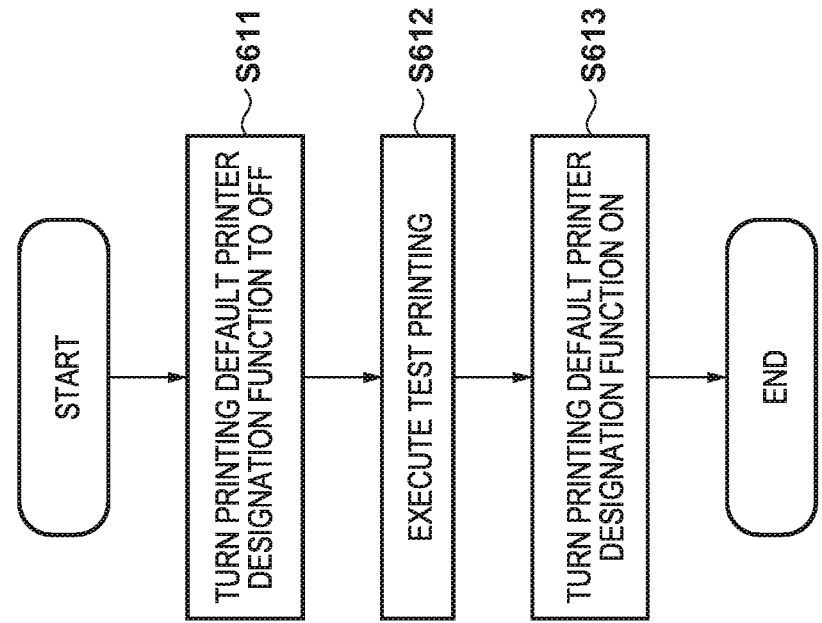
FIGS. 6A and 6B are flowcharts each illustrating the processing of disabling the default printer designation function.
Figure 6A:
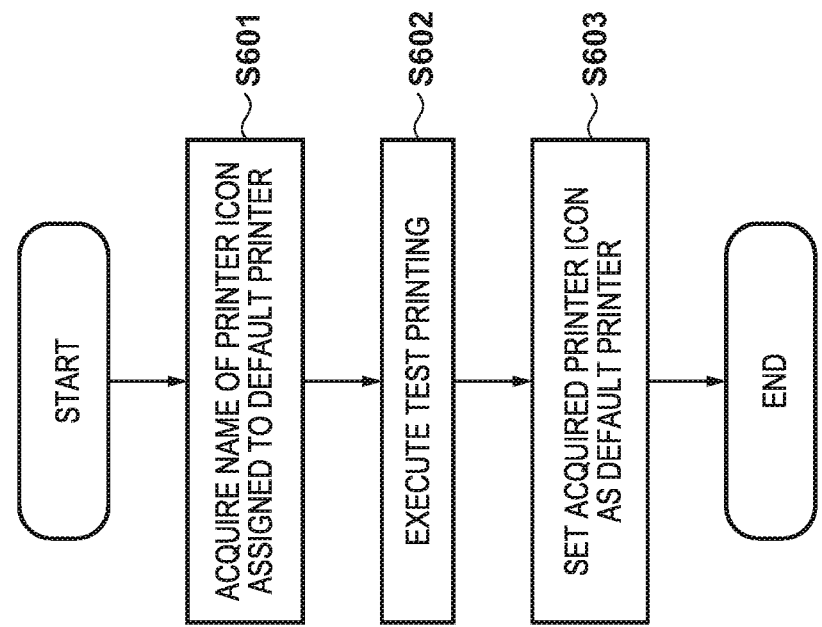

Note that the processing to be adopted may be switched between FIGS. 6A and 6B in accordance with user authority. For example, if the user has no registry operation authority, FIG. 6A is adopted. If the user has no default printer setting authority, FIG. 6B is adopted.

As described above, according to this embodiment, the processing shown in FIG. 6A or 6B restricts the printing default printer designation function. With this arrangement, even in an environment in which the printing default printer designation function is in the enabled state, when no default printer is designated and test printing is executed, the default printer setting can remain the same.

Fourth Embodiment

In the fourth embodiment, the difference from the first to third embodiments will be described below. In this embodiment, either the default printer setting screen 210 in FIG. 2B or the default printer setting screen 230 in FIG. 2D may be used.

Figure 7:
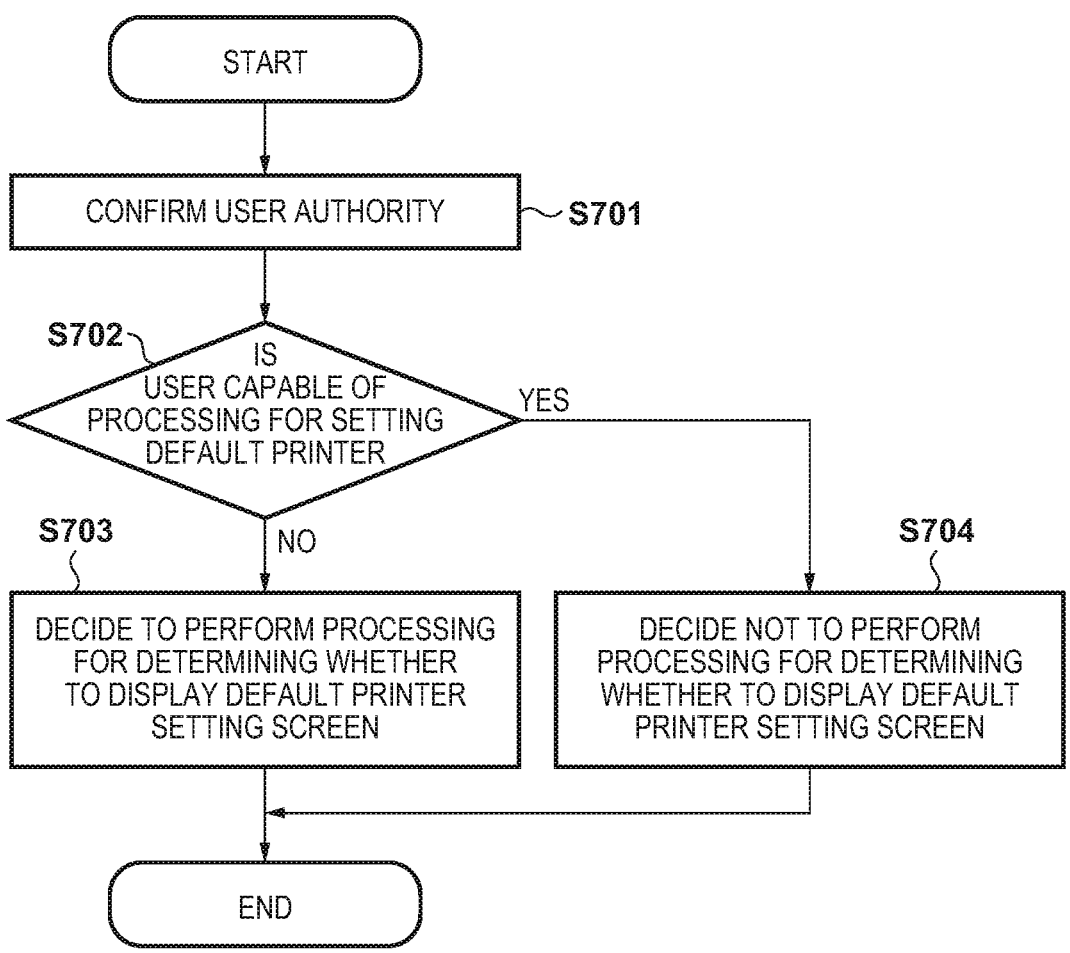
FIG. 7 is a flowchart illustrating switching of processing in accordance with user authority.

FIG. 7 is a flowchart illustrating processing of switching processing in accordance with user authority. The processing shown in FIG. 7 is implemented when, for example, a program stored in a ROM 102 is read out into a RAM and executed. An installer starts the processing shown in FIG. 7 before the default printer setting screen 210 or 230 or a test printing screen 220 is displayed. The installer confirms user authority (step S701), and determines whether the user has authority capable of setting a default printer (step S702). If it is determined that the user has no authority capable of setting a default printer, it is decided to perform processing shown in FIG. 3 (step S703), and then the processing shown in FIG. 7 ends. If it is determined in step S702 that the user has authority capable of setting a default printer, the installer decides not to perform the processing shown in FIG. 3 (step S704), and then ends the processing shown in FIG. 7. If the processing in step S704 is performed, the installer displays the default printer setting screen 210 or 230.

As described above, according to this embodiment, it is possible to switch, in accordance with user authority, whether to execute the processing shown in FIG. 3. For example, if the user cannot perform a default printer designation operation, the processing shown in FIG. 3 is executed.

Fifth Embodiment

A procedure may display, first, the default printer setting screen 210 or 230 or the test printing screen 220 of the installer described in each embodiment. Furthermore, the default printer setting function and the test printing function may be formed by the same screen.

Each embodiment has exemplified the installer. However, any software having the test printing function and the default printer setting function may be adopted, and the same effect can be obtained. For example, software of repairing the registered state of the printer icon (printing port), or printer icon control software having a function of switching the printer icon (printing port) may be adopted.

Figure 9:
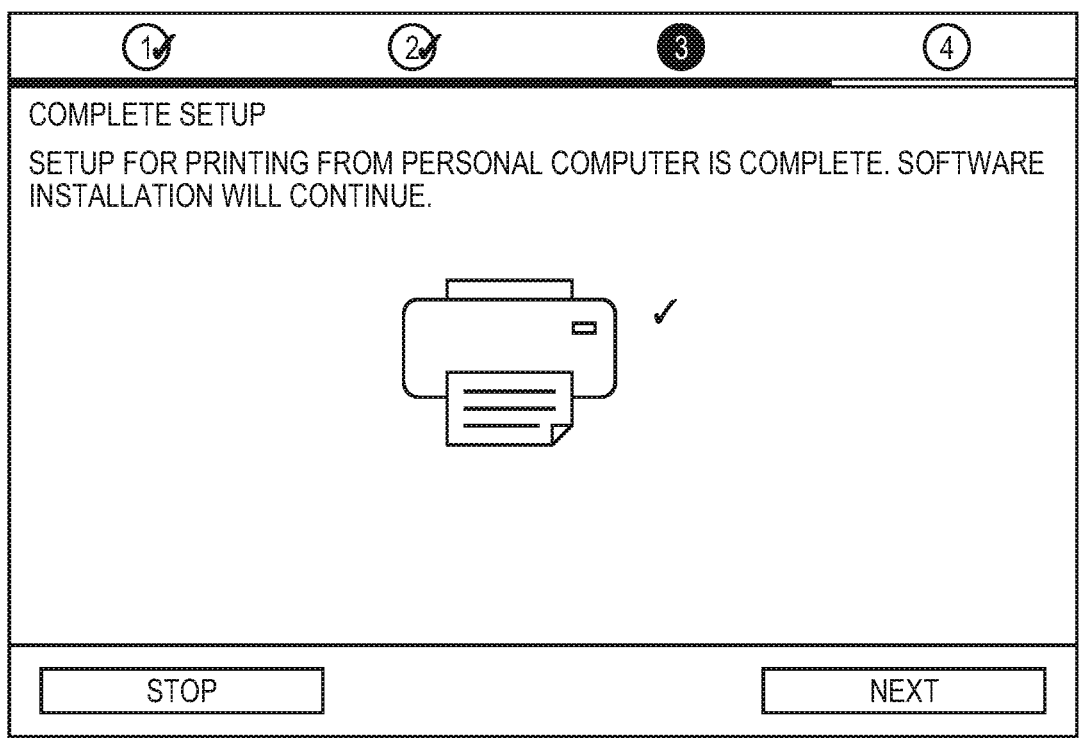
FIG. 9 is a view showing a screen of the installer.
Figure 10A:
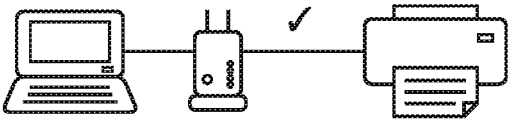
FIGS. 10A and 10B are views each showing a screen of software other than an installer.
Figure 10B:
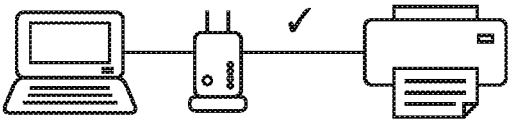

Note that as a result of diagnosing the connection state between an information processing apparatus (corresponding to the PC 100 shown in FIG. 1) and a printer using the software of repairing the registered state of the printer icon (printing port), and repairing the registered state, FIG. 9 is displayed. For example, if it is determined in step S302 of FIG. 3 that the function is in the disabled state, a screen of FIG. 10A including "set as printer normally used" is displayed. If it is determined in step S302 that the function is in the enabled state, a screen of FIG. 10B including no "set as printer normally used" is displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-027250, filed Feb. 19, 2018, which is hereby incorporated by reference herein in its entirety.

What is claimed is:

1. A print control apparatus for controlling a printing apparatus, comprising:
　　a display control unit configured to cause a display unit to display a setup screen including a setting content associated with setting processing of a default printing apparatus that can be used without accepting a selection operation by a user, wherein the setup screen is a setup screen of software corresponding to the printing apparatus; and
　　an acquisition unit configured to acquire information about a function of setting the default printing apparatus, wherein the function is a function of automatically setting, as the default printing apparatus, a printing apparatus which has been instructed to execute printing, wherein the display control unit causes, if the acquired information indicates enabling of the function, the display unit to display the setup screen to be restricted such that the setting content is not able to be operated, and the display control unit causes, if the acquired information does not indicate enabling of the function, the display unit to display the setup screen such that the setting content is able to be operated, wherein the display control unit, and the acquisition unit are implemented by at least one processor.

2. The apparatus according to claim 1, wherein after a printer driver of the printing apparatus as the software is installed, the display control unit causes, based on enabling of the function, the display unit to display the setup screen which does not include the setting content.

3. The apparatus according to claim 1, wherein after a printer driver of the printing apparatus is installed as the software and before test printing for the printing apparatus is instructed, the display control unit causes, based on enabling of the function, the display unit to display the setup screen which does not include the setting content.

4. The apparatus according to claim 1, wherein after a printer driver of the printing apparatus is installed as the software and after test printing for the printing apparatus is instructed, the display control unit causes, based on enabling of the function, the display unit to display the setup screen which does not include the setting content.

5. The apparatus according to claim 1, wherein the acquisition unit acquires the information about the function of setting the default printing apparatus, in a case where an operating system includes the function of setting the default printing apparatus.

6. A control method executed in a print control apparatus for controlling a printing apparatus, comprising:

displaying a setup screen including a setting content associated with setting processing of a default printing apparatus that can be used without accepting a selection operation by a user, wherein the setup screen is a setup screen of software corresponding to the printing apparatus; and acquiring information about a function of setting the default printing apparatus, wherein the function is a function of automatically setting, as the default printing apparatus, a printing apparatus which has been instructed to execute printing, wherein, if the acquired information indicates enabling of the function, the displayed setup screen is restricted such that the setting content is not able to be operated, and if the acquired information does not indicate enabling of the function, the displayed setup screen is not restricted such that the setting content is able to be operated.

7. The method according to claim 6, wherein after a printer driver of the printing apparatus as the software is installed, based on enabling of the function, the displayed setting screen does not include the setting content.

8. The method according to claim 6, wherein after a printer driver of the printing apparatus is installed as the software and before test printing for the printing apparatus is instructed, based on enabling of the function, the displayed setup screen does not include the setting content.

9. The method according to claim 6, wherein after a printer driver of the printing apparatus is installed as the software and after test printing for the printing apparatus is instructed, based on enabling of the function, the displayed setup screen does not include the setting content.

10. The method according to claim 6, wherein the information about the function of setting the default printing apparatus is acquired, in a case where an operating system includes the function of setting the default printing apparatus.

11. A non-transitory computer-readable storage medium storing a program for causing a computer to execute:

displaying a setup screen including a setting content associated with setting processing of a default printing apparatus that can be used without accepting a selection operation by a user, wherein the setup screen is a setup screen of software corresponding to the printing apparatus; and acquiring information about a function of setting the default printing apparatus, wherein the function is a function of automatically setting, as the default printing apparatus, a printing apparatus which has been instructed to execute printing, wherein, if the acquired information indicates enabling of the function, the displayed setup screen is restricted such that the setting content is not able to be operated, and if the acquired information does not indicate enabling of the function, the displayed setup screen is not restricted such that the setting content is able to be operated.

12. The storage medium according to claim 11, wherein after a printer driver of the printing apparatus as the software is installed, based on enabling of the function, the displayed setting screen does not include the setting content.

13. The storage medium according to claim 11, wherein after a printer driver of the printing apparatus is installed as the software and before test printing for the printing apparatus is instructed, based on enabling of the function, the displayed setup screen does not include the setting content.

14. The storage medium according to claim 11, wherein after a printer driver of the printing apparatus is installed as the software and after test printing for the printing apparatus is instructed, based on enabling of the function, the displayed setup screen does not include the setting content.

15. The non-transitory computer-readable storage medium according to claim 11, wherein the information about the function of setting the default printing apparatus is acquired, in a case where an operating system includes the function of setting the default printing apparatus.

* * * * *